(No Model.) 2 Sheets—Sheet 1.
N. H. ROBERTS.
SAW SWAGE.
No. 469,410. Patented Feb. 23, 1892.
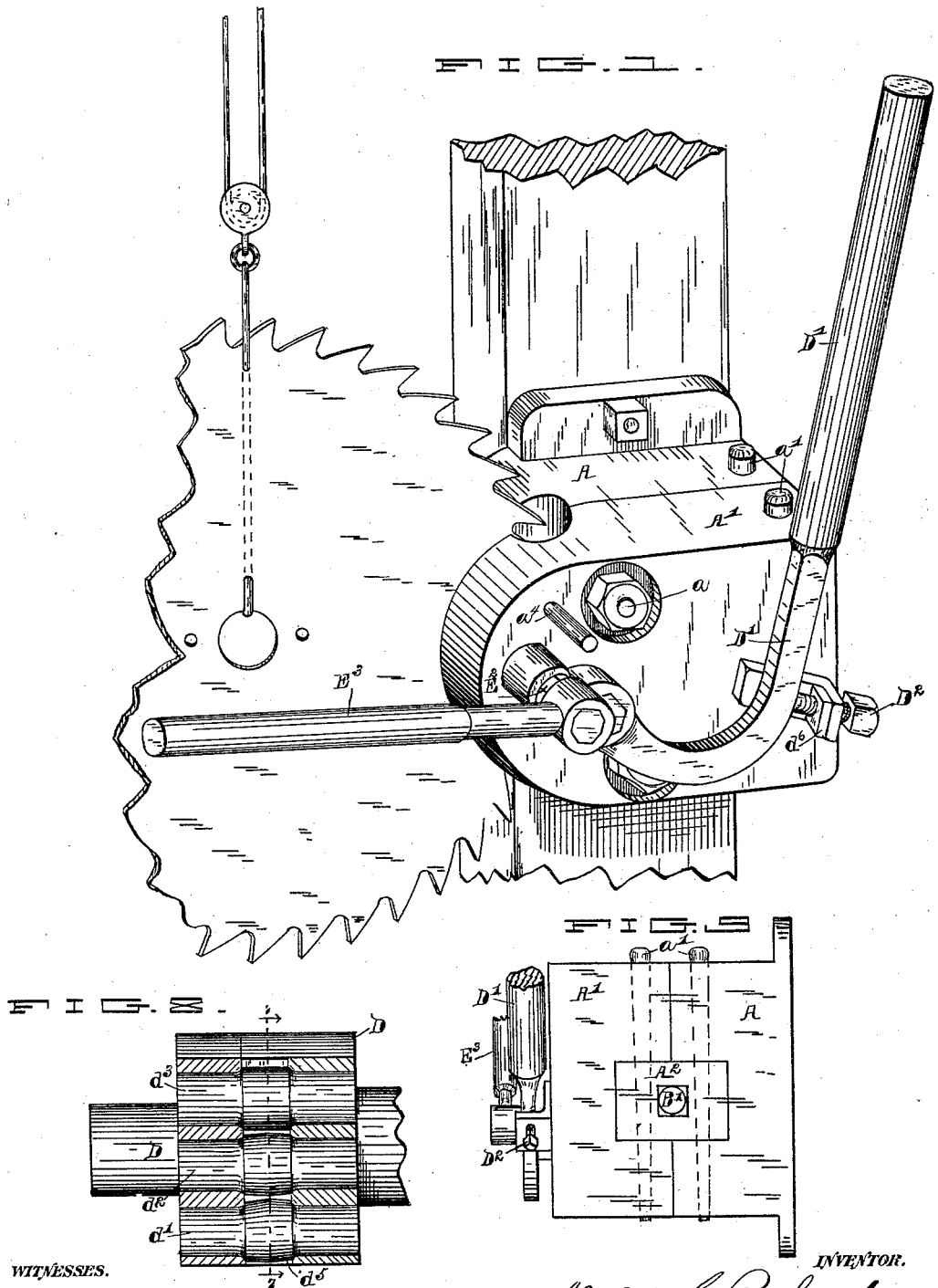

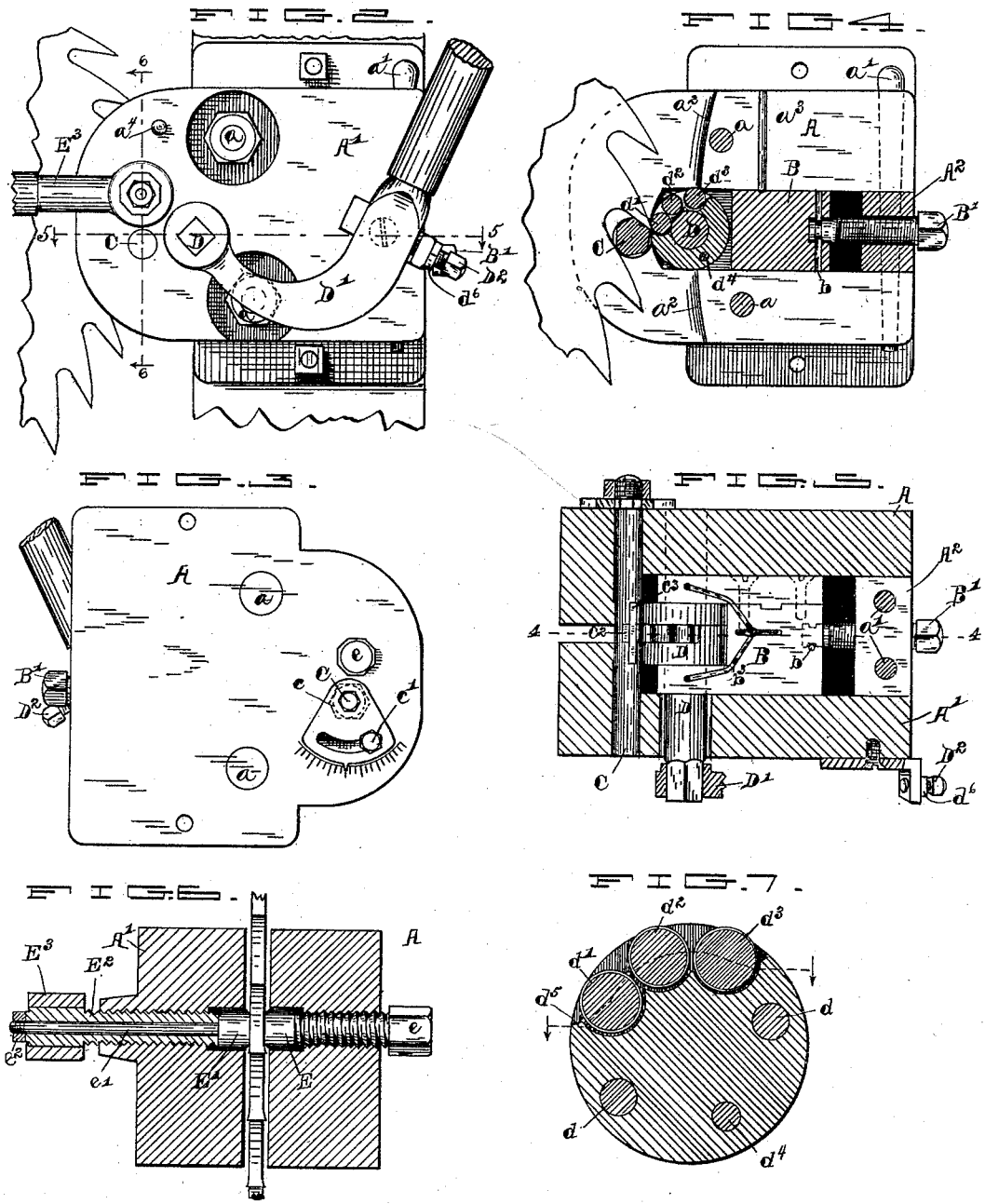

UNITED STATES PATENT OFFICE.

NATE H. ROBERTS, OF INDIANAPOLIS, INDIANA.

SAW-SWAGE.

SPECIFICATION forming part of Letters Patent No. 469,410, dated February 23, 1892.

Application filed June 1, 1891. Serial No. 394,757. (No model.)

*To all whom it may concern:*

Be it known that I, NATE H. ROBERTS, a citizen of the United States, residing at Indianapolis, in the county of Marion and State of Indiana, have invented certain new and useful Improvements in Saw-Swages, of which the following is a specification.

The object of my said invention is to provide a machine for swaging saw-teeth, the anvil and die of which are constructed and arranged capable of being adjusted to various relative positions to each other, whereby the machine is adapted for use on teeth of various forms and whereby different degrees of upset may be given the teeth, and one which will operate upon the teeth gradually and with the least possible friction, whereby the teeth may be swaged to a very thin point, if desired, and be properly spread without any danger of splitting or cracking the metal of which they are composed, all of which will be hereinafter more particularly described and claimed.

Referring to the accompanying drawings, which are made a part hereof, and on which similar letters of reference indicate similar parts, Figure 1 is a perspective view of a saw-swage embodying my said invention secured on a supporting-post and illustrating a saw as supported in the position it occupies when being swaged thereby, the saw shown being a circular saw and the particular form of machine shown, in so far as the construction of its frame and various adjusting parts is concerned, being particularly adapted for swaging saws of this character, or saws which in being swaged are moved through the machine, which is in a stationary position. Fig. 2 is a view in elevation of the front side of the machine; Fig. 3, a similar view of the back side of the machine; Fig. 4, a central longitudinal section on the dotted line 4 4 in Fig. 5; Fig. 5, a horizontal section on the dotted line 5 5 in Figs. 2 and 4 through the outside casting, the interior parts being shown in elevation; Fig. 6, a cross-section looking in the direction indicated by the arrows from the dotted line 6 6 in Fig. 2; Fig. 7, a cross-section through the swaging-die on the dottd line 7 7 in Fig. 8, the parts being shown on an enlarged scale; Fig. 8, a detail view looking in the direction of the arrows from the dotted line 8 8 in Fig. 7, the round parts being shown in elevation; and Fig. 9, a rear elevation of the machine.

In said drawings the portions marked A A' represent the two parts of the main frame; B, the bearing-block for the swaging-die; C, the anvil, and D the swaging-die.

The main frame consists of two castings A and A', formed with closely-fitting adjacent faces separably secured together by bolts $a$ and by vertical tapered pins $a'$, extending through correspondingly-formed perforations, one of which extends through each of said parts and each end of a block $A^2$, which is mounted in a recess formed partly in each casting. The adjacent faces of said parts are cut out from their front ends back to a shoulder $a^2$, which forms a way of sufficient width to receive the saw-plate. Their rear adjacent faces are also cut out or recessed to receive the block $A^2$ and the block B, which carries the swaging-die, which recess extends in from the rear of the frame to a point which will allow said swaging-die to be adjusted to the anvil. (See Figs. 4 and 5.) When the block B is to be placed in or removed from the recess, the frame is taken apart, as will be readily understood.

The block B is made up of two parts securely fastened together by means of an interlocking tongue and groove and screws, as shown most plainly in Fig. 5. It is formed with a recess in its forward end to receive the swaging-die D, having journal-bearings formed in its sides for the journals of said die. Said block is mounted to be adjusted longitudinally by means of a screw B', which extends through a threaded perforation in the block $A^2$ and into a perforation in the rear end thereof, being secured therein by means of a vertical pin $b$ in said block, which engages with a circumferential groove near its end.

The anvil C consists of a shaft of hardened steel mounted in a suitable bearing in the main frame, consisting of a perforation extending through the two parts of which said frame is composed. One end of said anvil projects from said frame, and is formed with an eight-sided shoulder at a point just outside the frame and is screw-threaded from said shoulder to the end. On said shoulder is mounted a plate c, which is secured thereon by a nut (indicated by dotted lines in Fig. 3) on the threaded end. Said plate is formed with a curved slot, and a screw-bolt c' is inserted through said slot into a screw-threaded perforation in the side of the frame. By this means said anvil is firmly secured in the desired position, and its adjustment to bring its operating-face into different angles is permitted when desired. On the lower edge of said plate is preferably formed an indicator-point, and a series of indicator-marks is formed on the side of the frame adjacent, as shown, thus providing means for determining the angle of the operating-face, as will be readily understood. Said operating-face consists of a short flattened portion, upon which the tooth rests, said portion being of a length just equal to the length of the operating rolls or faces in the die. Below said operating-face is formed a narrower straight face extending the entire width of the die-head, thus forming a square or sharp corner, over which the point of the tooth may be swaged, and also permitting the die to be moved up into close proximity with said corner when desired.

While but one operating-face is necessary, yet I construct the anvil, as shown, with a series of operating-faces, consisting of the short and long straight surfaces with a corner between them, which series extends around the shaft, and thus when one face becomes worn or unfit for further use another can be brought into operative position by removing the nut and withdrawing the anvil from its seat in the plate c, turning it to the desired position and then re-securing it in said plate. By forming the wide operating-face of only the length of the rolls or operating-faces of the swaging-die the anvil is afforded a bearing and support throughout its entire length, except for the short distance across the way for the saw in the front end of the frame, and any springing or yielding while in use is thus prevented.

The operating-die D consists of a head composed of two disks rigidly secured together by means of countersunk screws $d$ and a dowel $d^4$, each part having a journal adapted to fit in the journal-bearings formed in the sides of the block B, which is taken apart when said head is inserted. One of said journals extends through the bearing in said block B and cut through an opening in the part A' of the frame, the end thereof being squared and having an operating-lever D' secured thereon. Said opening in the frame is of a size sufficient to permit the slight longitudinal adjustment of the block B necessary. Said head is formed with a central recess in one side, with bearings on each side thereof adapted to receive the journals of the swaging-rolls $d'$, $d^2$, and $d^3$. Said rolls are arranged in a series, as shown, and the operating-face of each succeeding roll projects slightly farther than the face of the one immediately preceding it, the bearing for each being preferably formed at a greater distance from the center of the journal on which the die rotates. The operating-face of the roll $d'$ is formed higher in its center than at each side, as is also the face of the roll $d^2$, the degree of inclination being less, however, and the face of the roll $d^3$ is formed straight. In front of the roll $d'$ a straight face $d^5$ is formed across the recess in the head, which serves as a "tooth-rest" or a face against which the point of the tooth is placed when in position to be swaged. In use the head is adjusted to bring said tooth-rest to a position where it will be in close proximity to and slightly below the corner of the operating-face of the anvil, this position being secured by the proper adjustment of the stop $D^2$ to limit the backward movement of the lever D', so as to bring said tooth-rest into this position, when said lever is thrown back against said stop. Said stop $D^2$ consists of a set-screw mounted in a suitable plate secured to the side of the casting A', a jam-nut $d^6$ being mounted thereon to secure it in the adjusted position and prevent any accidental movement thereof after it has been adjusted to the desired position. By this means each tooth may be brought into the same position in relation to the operating parts, and all the teeth of the saw be thus given a uniform degree of swaging.

The clamp for holding the saw while being swaged consists of two clamping-jaws E and E'. The stem of said jaw E is formed screw-threaded with a squared head $e$ on its outer end and is mounted in a screw-threaded perforation in the part A of the frame. The jaw E' is mounted on a spindle $e'$, which extends out through a hollow screw-threaded shank $E^2$, mounted in a screw-threaded perforation in the part A' of the frame, the inner end of said shank bearing against said jaw and the two parts being secured together by a nut $e^2$ on the outer end of the spindle $e'$. The outer end of the shank $E^2$ is formed square and has an operating-lever $E^3$ mounted thereon, by which the jaw is operated. In use the jaw E is adjusted to just that position desired and then operates as a fixed jaw, against which the saw is clamped by the other head, which operates as a movable jaw, said jaw E' being operated by the turning of the shank $E^2$ by means of the lever $E^3$ on its end, which operates to push said jaw in and out to clamp and release the saw, but does not operate to rotate the jaw E' after it has come against the saw-plate, as the connection between the part $E^2$ and the shank of the jaw is sufficiently loose to permit the rotation of the one without the rotation of the other. By this arrangement the teeth of the saw can be tightly clamped without being marked, as is usual where the clamps move against the polished metal, thus saving the labor of dressing off said marks after the saw is swaged.

The operation of my said invention is as follows: The anvil C and the operating-die D are first adjusted into proper relation with each other, the tooth-rest $d^5$ being brought into the relation with the operating corner of the anvil before described, and the stop $D^2$ being so adjusted that this position will always be secured when the operating-lever $D'$ is thrown back against it. In swaging different forms of teeth it will be found necessary to adjust the operating-face of the anvil to different angles, in order that the swaging-die may strike the tooth and swage it back the desired distance from its point. For example, if the tooth of the saw, as shown in Fig. 4, were formed with a high back, as some circular-saw teeth are, and placed upon the anvil at the angle shown, the swaging-die would strike the tooth and swage it farther back of the point than would be desirable, and if a slimmer tooth it would be swaged too near the point. Such adjustment can be readily secured by turning the anvil so that its operating-face will be nearer in a horizontal plane and adjusting the frame carrying the swaging-die so as to bring said die into close proximity with said anvil and then adjusting the stop $D^2$ so that the tooth-rest of the swaging-die will be in the same relative position to the corner of the operating-face, as shown. By adjusting the parts in the reverse direction the machine will be adapted for swaging slimmer teeth. Said parts being adjusted to suit the character of tooth to be swaged and the character of work to be performed, the saw is placed in position so that the under side of the tooth will rest squarely upon the face of the anvil, with its point projecting slightly over the corner thereof and against the tooth-rest $d^5$ of the operating-die. The clamping-jaw $E'$ is then forced against the side of the tooth, as before described, which is thus rigidly secured in this position. The operating-lever $D'$ is then brought forward, which rotates the head D, bringing the first roll $d'$ against the tooth. Said roll being formed with a tapered face, having its highest point in the center, as before described, its operation is simply to form a depression in the center of the tooth and spread the metal somewhat in each direction from the center. The space between said roll and the corner of the anvil being considerable, sufficient metal of the tooth is left between the two parts to prevent any liability of its splitting or cracking, as is often the case when the swaging is done by a die with a single operating-face. The roll $d^2$, next coming against the tooth in the condition in which the roll $d'$ left it, operates to reduce the point to a flatter condition, inasmuch as the taper each way from the center of said roll is of a less degree than the taper of the roll $d'$, as before described, the tooth being still further spread and the metal reduced to a thinner condition by reason of the closer proximity to the anvil of this roll. The roll $d^3$ then comes against the tooth in the condition in which it was left by the roll $d^2$, and being formed with a straight face and journaled in a position so that its surface will come in close proximity to the corner of the operating-face of the anvil, it operates to smooth off and straighten the surface of said tooth and reduce the metal to a sharp edge, cutting off the point of the tooth square and straight on the corner of the anvil. The tooth being thus operated upon and reduced gradually, any liability of cracking or splitting the same is overcome and a finish secured to the point which requires little or no dressing or filing to put the saw in condition for use.

In the top face of the block B, I have shown an oil-channel $b^3$ extending each way from a central recess, which communicates with an oil-hole $a^3$ in the frame to oil-holes leading into the bearings for the journals of the head D, thus providing for the lubrication of said bearings. A stop-pin $a^4$ is also shown, against which the lever $D'$ strikes when brought forward, until all the rolls of the die have operated.

While I have shown a series of three rolls in the operating-die, yet I do not wish to be understood as limiting my invention to this or any number, as after a saw is once swaged, or where the teeth are light and slim in formation, two rolls may be found sufficient to do the work, or in some cases, where but a slight redressing of the teeth is desired, the third roll alone may be found sufficient. Again, in the case of very heavy and thick teeth of large saws it may be found desirable to use more than three rolls. The machine shown is, however, one that has been found very suitable and best adapted for use in swaging the teeth of new circular saws of a moderately-heavy pattern.

By the use of this machine, as will be noticed, the teeth are always swaged upon the top side, leaving the original pitch of the tooth undisturbed, which is of considerable advantage over other machine-swages in use.

I am aware that dies for saw-swaging machines have heretofore been made with different forms of configurations upon their operating-faces, and I therefore do not claim a die with a tapered operating-face broadly, but limit myself to the particular construction and combination herein claimed.

Having thus fully described my said invention, what I claim as new, and desire to secure by Letters Patent, is—

1. In a saw-swaging machine, the combination of the main frame, the adjustable bearing-block B, formed in two parts and mounted in suitable recesses in said frame, the operating-die D, consisting of two disks secured together, provided with journals, which are mounted in suitable bearings in said bearing-block, the operating-face of said die consisting of a series of rolls journaled in suitable bearings formed in the adjacent faces of the two parts of said operating-die and arranged so that the face of each succeeding roll will project slightly beyond the face of the one preceding it, the anvil C, and the operating-levers for operating said die and anvil, all substantially as set forth.

2. The combination, in a saw-swaging machine, of a die consisting of a rotary head having a series of rolls journaled therein, which constitute the operating-faces thereof, the first of which is formed tapered on straight lines from its center to the sides of its operating-face and the last one of which is formed straight, substantially as set forth.

3. The combination, in a saw-swaging machine, of a die consisting of a rotary head having a series of rolls journaled therein, which constitute the operating-faces thereof, arranged with each succeeding roll in closer proximity to the anvil than the preceding one, the first roll being formed with a face tapered each way from its center and the taper of the succeeding rolls gradually diminishing until the face of the last roll is formed straight, substantially as described, and for the purpose as specified.

4. A rotary die for saw-swaging machines, having a shoulder or tooth-rest formed therein just below its operating-face, substantially as set forth.

5. An operating-die for saw-swaging machines, consisting of a rotary disk, with a rotary operating-face journaled therein and a shoulder or tooth-rest formed just below said operating-face, one of the journals of said die extending out through the frame of said machine and having an operating-lever mounted thereon, an adjustable stop being mounted on the side of said machine, against which said operating-lever will rest when thrown back, whereby said tooth-rest may be brought to the desired position in relation to the anvil before the tooth is placed in position to be swaged and brought to the same position for each succeeding tooth, substantially as set forth.

6. An anvil for a saw-swaging machine, formed with a straight operating-face of a length corresponding to the length of the operating-face of the die, with another straight face below it of a length corresponding to the width of the die-head, and said die, substantially as set forth.

In witness whereof I have hereunto set my hand and seal, at Indianapolis, Indiana, this 25th day of May, A. D. 1891.

NATE H. ROBERTS. [L. S.]

Witnesses:
E. W. BRADFORD,
FRANK W. WOOD.